United States Patent [19]

Mallay

[11] 4,167,386

[45] Sep. 11, 1979

[54] EXTRUSION DIE PLATE CONSTRUCTION

[75] Inventor: John B. Mallay, Houston, Tex.

[73] Assignee: Muesco-Mallay Houston, Inc., Houston, Tex.

[21] Appl. No.: 836,318

[22] Filed: Sep. 26, 1977

[51] Int. Cl.² .............................................. B29F 3/04
[52] U.S. Cl. .................................... 425/463; 425/467
[58] Field of Search ...................... 425/382, 382.2, 461, 425/463, 464, 725, 379 R, 467; 264/176 F

[56] References Cited

U.S. PATENT DOCUMENTS

| 3,599,285 | 8/1971 | Hamilton | 425/379 X |
| 3,599,286 | 8/1971 | Karet | 425/464 |

FOREIGN PATENT DOCUMENTS

| 652307 | 8/1964 | France | 425/464 |

Primary Examiner—Mark Rosenbaum
Attorney, Agent, or Firm—Browning, Bushman & Zamecki

[57] ABSTRACT

An extrusion die plate and method of making same, the die plate having a die plate body with a die plate face, and a plurality of extrusion passageways in the die plate body terminating generally at the die plate face. Discreet, spaced extrusion port formations made of a unitary body of a machinable material of greater hardness than the material of the die plate body are positioned on the die plate body, each of the formations defining an extrusion port which registers with a respective one of the extrusion passageways in the die plate body, the extrusion port defining a terminal extrusion orifice, each of the formations having a substantially planar discharge surface surrounding the extrusion orifice, the respective discharge surfaces being substantially coplanar with each other and with an abrasion resistance facing positioned on the die plate face, the facing substantially filling the space between the extrusion port formations and, together with the discharge surfaces on the extrusion port formations, forming a substantially planar discharge face.

9 Claims, 5 Drawing Figures

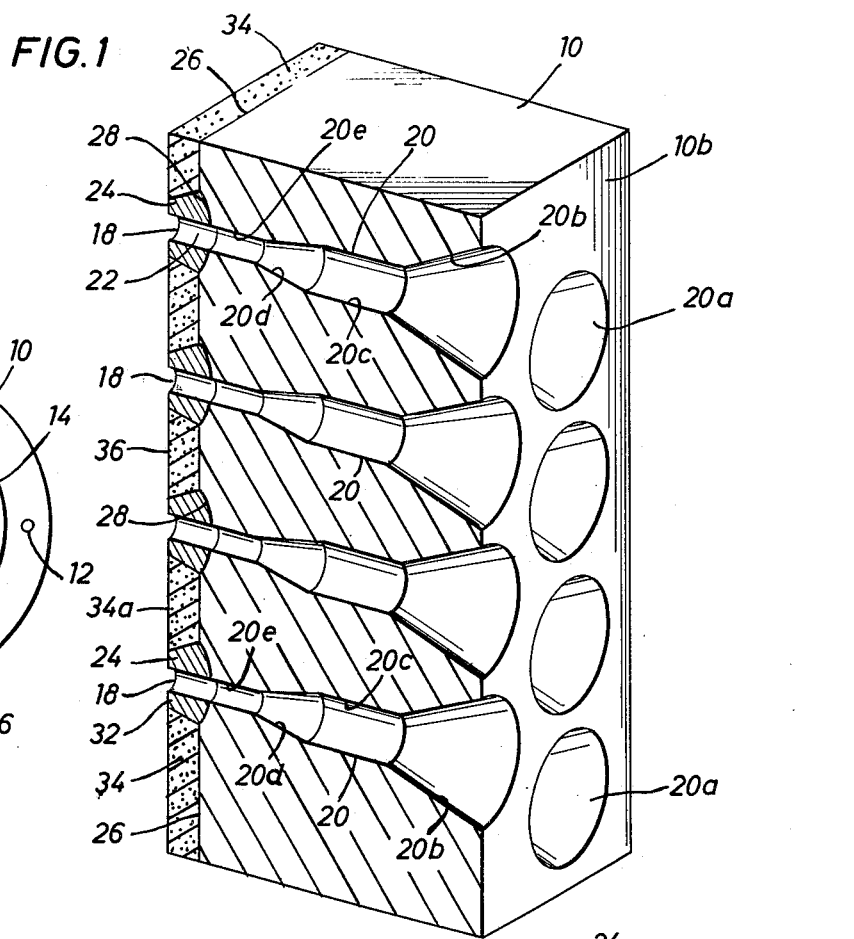
FIG. 1
FIG. 6
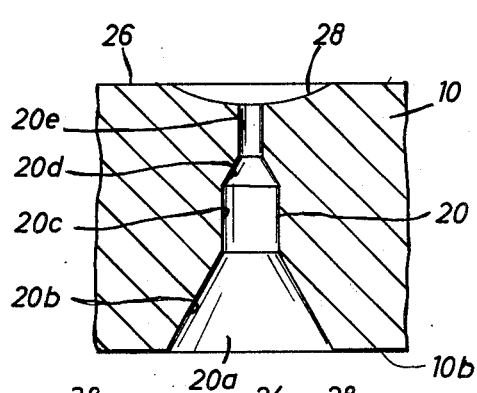
FIG. 2
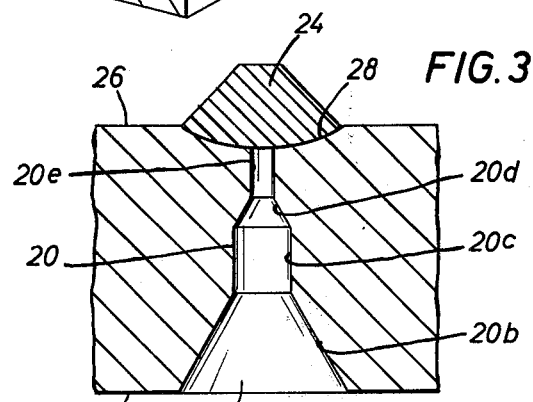
FIG. 3
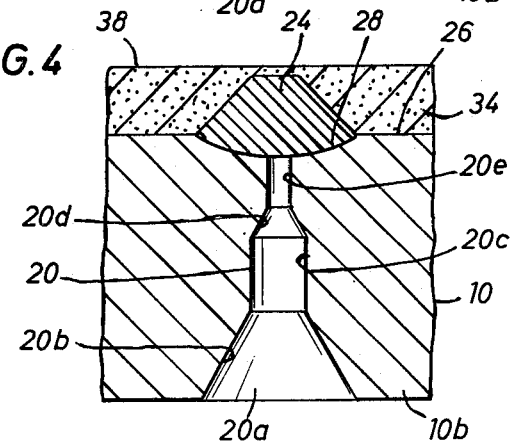
FIG. 4
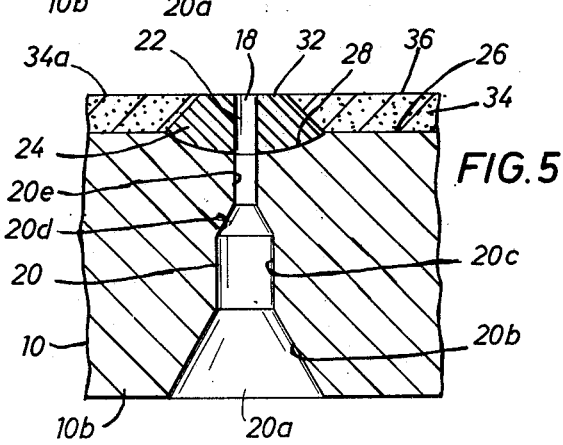
FIG. 5

EXTRUSION DIE PLATE CONSTRUCTION

BACKGROUND OF THE INVENTION

The present invention relates to an extrusion die plate and a method of making same. More specifically, the invention is directed to a die plate of greater wear resistance and suitable for use in the extrusion of plastics containing fillers, particularly fillers which are relatively hard and have a tendency to be abrasive.

In the extrusion of synthetic resins and similar plastic materials to form pellets, the extruded material is severed into the appropriate size pellets by a knife or blade which periodically wipes across the discharge side of the extrusion die plate, the wiping action resulting in a severing of the extruded molten plastic into generally cylindrical pellets as the resin exits the die plate. The wiping or cutting action of the cutting blades or knives across the external or discharge face of the die plate, causing the discharge face to wear rapidly. To overcome this excessive wearing, it is common practice in constructing die plates to provide a facing on the discharge face which is extremely hard and abrasion resistant. Thus, facings of materials such as tungsten carbide, ceramics or other extremely hard, abrasion resistant materials are commonly employed. While the use of such abrasion resistant materials substantially reduces the wearing problems caused by the rotating cutting assembly, other problems are presented by the use of such materials. The hard, abrasion resistant materials are intrinsically brittle, not easily machinable and susceptible to slivering, chipping, etc. Accordingly, attempts to drill holes in such materials to form the extrusion ports or passageways usually result in slivering, splintering or chipping. When this occurs, the extrusion port becomes irregular in cross-sectional shape and consequently the pellets are likewise not uniform in cross-sectional shape or size. However, such uniformity is necessary so that the pellets may be accurately measured by volume.

Die plate construction aimed at circumventing the above described problem is described in U.S. Pat. No. 3,599,285 to Hamilton. The Hamilton patent discloses a die plate in which the relatively soft, machinable base metal which forms the main body of the die plate is used to form a series of protruding nozzles which terminate at the discharge face of the die plate. The space between the nozzles is filled with a facing of tungsten carbide or some other similar hard and abrasion resistant material. Thus, smooth, uniform extrusion ports can be drilled or otherwise formed in the machinable base metal forming the main body of the die plate. On the other hand, since the major portion of the discharge face is comprised of hard tungsten carbide or similar abrasion resistant material, the die plate discharge face will not wear excessively. U.S. Pat. No. 3,271,822 to Rhino discloses a die plate in which the extrusion orifices and a portion of the extrusion ports are formed by a plurality of discreet wafers of tungsten carbide which are brazed to the die plate body.

While the die plate disclosed in the Hamilton patent is a vast improvement over prior art die plates, it suffers from the infirmity that because the extrusion orifices are formed by the relatively soft base plate material, the orifices and extrusion ports immediately adjacent thereto tend to wear rather rapidly which again results in the production of non-uniform sized pellets. Such wearing is particularly acute when resins loaded with inorganic or other hard fillers are being extruded. The Rhino et al die plate requires the use of tungsten carbide wafers having preformed extrusion orifices or apertures which must be individually positioned on the die plate face such as by brazing or the like. Moreover, because the extrusion ports and orifices of the Rhino die plate are formed by tungsten carbide, a material which is extremely brittle and which can not be machined easily, the likelihood of chipping or slivering of the extrusion orifice or port is increased.

SUMMARY OF THE INVENTION

It is therefore an object of the present invention to provide a novel extrusion die plate construction.

A further object of the present invention is to provide an extrusion die plate which is highly wear resistant and can be used for the extrusion of filled resins.

Another object of the present invention is to provide a method of manufacturing a highly wear resistant extrusion die plate.

The above and other objects of the present invention will become apparent from the drawings, the description given herein and the appended claims.

The extrusion die plate of the present invention is fundamentally of a three component design comprising a die plate body, extrusion port formations and an abrasion resistant facing. The die plate body, which generally speaking will be made from a relatively soft, easily machinable base metal, is provided with a plurality of extrusion passageways which generally terminate at a surface referred to as the die plate face. Positioned on the die plate body are a plurality of discreet, spaced extrusion port formations, the formations having a portion which protrudes outwardly from the die plate face, each of which define an extrusion port which registers with one of the extrusion passageways in the die plate body. The extrusion port, in turn, terminates at an extrusion orifice distal the die plate face. Each of the extrusion port formations is formed of a unitary body of a machinable material which possesses a greater abrasion resistance and generally a greater hardness than the material of the die plate. A substantially planar discharge surface is formed on the extrusion port formation in surrounding relationship to the extrusion orifices, the planar discharge surfaces being substantially coplanar. An abrasion resistant facing, such as for example, tungsten carbide, a ceramic, or an abrasion resistant alloy such as a hardened ferrous metal, is positioned on the die plate face to substantially fill the space between the extrusion port formations. The facing, together with the discharge surfaces on the extrusion port formations forms a substantially planar discharge face on the die plate.

In making the die plate, the extrusion port formations are positioned on the die plate body so as to protrude outwardly from the die plate face, the formations being disposed in spaced relationship to one another. The facing of the abrasion resistant material is then positioned on the die plate face to substantially fill the space between the discreet, extrusion port formations. The outer surfaces of the facing and the protruding portions of the extrusion port formations are worked to form a substantially planar discharge face, the discharge face being formed by the facing and a plurality of spaced, discreet discharge surfaces on the outer surface of the extrusion port formations.

BRIEF DESCRIPTION OF THE DRAWINGS

FIG. 1 is an isometric view, partly in section, of a portion of a die plate according to the present invention.

FIGS. 2-5 depict various stages in the construction of the die plate wherein:

FIG. 2 is an enlarged fragmentary view, in section, of the die plate body in an initial stage of fabrication;

FIG. 3 is a view similar to FIG. 2, showing the second stage of fabrication;

FIG. 4 is a view similar to FIGS. 2 and 3, showing the third stage of fabrication; and FIG. 5 is a view similar to FIGS. 2-4, showing the completed die plate.

FIG. 6 is a simplified, planar view of the discharge side of a die plate according to the present invention.

DESCRIPTION OF THE PREFERRED EMBODIMENTS

Reference is now made to the accompanying drawings for a detailed description of a preferred embodiment of the present invention. The letter "A" generally designates the die plate of the present invention adapted for use with a conventional extruder. Such an extruder or pelletizer is disclosed in U.S. Pat. No. 3,599,285, herein incorporated by reference for all purposes. While the extruder or pelletizer, per se, is conventional and does not form a part of this invention, by way of simplifing an understanding of the use of the die plate of the present invention, a brief description of the operation of such a device, such as shown for example in U.S. Pat. No. 3,599,285, will be given. As described in the aforementioned patent, the extruder is adapted to receive a feedstock of a plastic or resinous material such as polyethylene, polypropylene or the like in a granulated form, and to convert the feedstock, via heat and/or pressure into a flowable, extrudable material which can be forced through a die plate such as die plate A of the present invention. As further shown in the referenced patent, the extruder has a hopper adapted to receive the granulated resin feedstock and a heating chamber wherein the feedstock is converted into its extrudable form. The extrudate is passed, in the conventional manner, outwardly through a die plate such as the die plate A of the present invention. As the extruded plastic or resin exits the extrusion orifice of the die plate, it is severed into a series of generally uniform, cylindrically shaped pellets by a cutter assembly which is mounted on the discharge side of the die plate such as the die plate A of the present invention. The cutter assembly, as shown in the Hamilton patent, consisting of one or more cutter knifes which are rotated or otherwise moved substantially against the discharge face of the die plate.

Reference is now made to the drawings for a detailed description of the die plate of the present invention. It will be understood that extrusion die plates vary considerably in disposition and number of extrusion ports, methods of attachment to pelletizers and other features peculiar to the die plate depending on with which type of pelletizer or extruder the die plate is to be used. Such features form no part of the present invention, the construction of the die plate described herein being adapted to virtually any extrusion die plate. As best seen with reference to FIG. 6, the die plate A, which is generally cylindrical in nature, comprises a die plate body, shown generally as 10. The die plate body has a discharge side 10a and an inlet side 10b, the designations as to discharge and inlet referring to the flow path of the resin being extruded through the die plate A. A series of circumferentially spaced bolt holes 12 and a recess 14 in the die plate A cooperate to permit mounting of the die plate A to the pelletizer and to accommodate the cutter blade assembly as well known in the art and described in the referenced Hamilton patent.

The die plate A has an annular, upset portion 16, portion 16 being upset with respect to the surface in which bolt holes 12 are formed. Upset portion 16, as will be described more fully hereafter, forms discharge face 36 against which the cutter blades move in severing the extruded plastic. Upset portion 16 is provided with a plurality of extrusion orifices 18 which terminate at face 36 and which are generally uniformly distributed but which can be in any desired, even non-uniform pattern.

Referring now to FIG. 1, it can be seen that extrusion through the die plate body 10 from inlet side 10b to discharge side 10a occurs through a plurality of extrusion passageways 20 each of which communicates with an extrusion port 22, described more fully below. Extrusion passageway 20 comprises an extrusion inlet 20a, a frustoconical bore portion 20b, a cylindrical bore portion 20c which communicates with the smaller end of the frustoconical bore portion 20b, a second, smaller frustoconical bore section 20d, the larger end of which communicates with cylindrical bore section 20c, and a cylindrical bore section 20e which communicates with the smaller end of the frustoconical bore section 20d. Cylindrical bore section 20e in turn communicates with and has substantially the same diameter as extrusion port 22.

Extrusion port 22 is formed in an extrusion port formation 24 which, as described more fully hereafter, is positioned on die plate body 10 and protrudes outwardly from die plate face 26 formed on an outer surface of die plate body 10. As best seen with FIGS. 1 and 2-5, die plate face 26 is provided with a plurality of spaced generally concave depressions or recesses 28, each of depressions 28 being formed in generally surrounding relationship to a respective die plate passageway 20 and, more specifically, defining the terminus of cylindrical bore portion 20e of extrusion passageway 20. As will be apparent from FIGS. 1 and 3-5, particularly FIG. 3, when formations 24 are disposed in depressions 28, they protrude outwardly from die plate face 26 forming a plurality of raised, spaced dimples. Each of formations 24 defines an extrusion port 22, extrusion port 22 terminating in an extrusion orifice 18. Each extrusion orifice 18 is surrounded by a substantially planar discharge surface 32, formed on formations 24, each of surfaces 32 being substantially coplanar.

Positioned on die plate face 26, substantially filling the space between extrusion port formations 24, is an abrasion resistant facing 34. As best seen with reference to FIGS. 1 and 5, facing 34 has a surface 34a which is substantially coplanar with discharge surfaces 32 and which, together with discharge surfaces 32, forms a substantially planar discharge face 36, face 36 being the surface against which a cutting knife wipes.

FIGS. 2-5 set forth the successive method steps used in constructing the die plate of the present invention. FIG. 2 shows the die plate body 10 having extrusion passageway 24 formed therein. Depression 28 is formed in die plate face 26 by milling or some other suitable technique. Depression 28 which is generally concave, is disposed in generally surrounding relationship to extrusion passageway 20. When depressions 28 have been formed in die plate face 26, extrusion port formations 24 are then positioned in the depressions 28, the extrusion port formations 24 being welded to die plate body 10. The term "welding", as used herein, is intended to mean the localized coalescence of metal wherein such coalescence is produced by heating to suitable temperatures, with or without the application of pressure, and with or without the use of filler material. While formations 24, as shown, are somewhat frustoconical in shape, it will be understood that they can have virtually any shape. Likewise, depressions 28 can be of any shape, it being preferred that the shape of depressions or recesses 28 is complimentary to that portion of formation 24 which is received therein. Following emplacement of formations 24 on die plate body 10, as shown in FIG. 3, the abrasion resistant facing 34 is then applied to die plate body 10. This can be accomplished, depending upon the material used as facing 34, in many different ways. However, in the case where tungsten carbide is used as facing 34, it is most easily accomplished by flame spraying. As seen in FIG. 4, the facing of tungsten carbide is deposited on die plate face 26 to a depth slightly greater than the outermost protrusion of extrusion port formation 24. The facing material 34 thus completely covers the extrusion port formations 24 and provides an outermost surface 38. By grinding or otherwise machining surface 38, discharge face 36 comprised of facing 34 and discharge surfaces 32 on extrusion port formations 24 is formed (See FIG. 5). As will be apparent from FIGS. 1 and 5, when discharge face 36 is formed, it will comprise a series of annular surfaces, i.e. discharge surfaces 32, each of which is surrounded by and is coplanar with the surface 34a of facing 36. Extrusion ports 22 are then drilled so as to register with bore 20e of extrusion passageway 20. While extrusion passageway 20 is shown as being initially formed in die plate body 10, it will be apparent to those skilled in the art that it can be formed following the complete construction of the die plate, i.e. after the step of FIG. 5 has been completed. It is also possible to drill extrusion port 22 in formation 24 prior to welding formation 24 to die plate body 10. Further passageways 20 and ports 22 can be formed after the step of FIG. 3.

Die plate body 10 is generally made of a relatively soft, easily machinable material such as stainless steel and can even be made of mild steel and other inexpensive metals. Extrusion port formation 24 is formed of a unitary body of a machinable material which is generally harder and more abrasion resistant than the material of die plate body 10 but which also can be machined without slivering, chipping or the like. The term "machinable" as used herein refers to a material which is resistant to slivering, chipping or splintering and which can be drilled, milled or subjected to similar machining techniques without a tendency for such chipping, splintering or slivering. Although numerous materials are suitable for use in forming extrusion port formation 24, cobalt-chromium-tungsten alloys sold under the trademark STELLITE have been found to be particularly suitable. Other abrasion and wear resistant alloys of different compositions than the base material can also be used.

It will be recognized that the types of material suitable for use in forming the extrusion port formations are intrinsically expensive. Relative ease of machinability, good abrasion resistance and hardness without accompanying brittleness is generally only accomplished by highly specialized alloying techniques. It is an important feature of the present invention that only a minimum amount of such material must be utilized. By employing the discreet extrusion port formation only at the precise points of maximum wear, the amount of such material utilized can be minimized. Thus, as explained above, for the most part the die plate will be made of relatively inexpensive base materials such as stainless steel, etc.

The facing material 34, different from the material of the die plate body and the formation 24, will be made of a hard, wear resistant material such as tungsten carbide, ceramics, wear resistant alloys such as hardened metals of ferric content, silicon carbide, boron carbide, diamond, aluminum oxide, etc. As noted above, particularly desirable as a facing material is tungsten carbide, which is extremely hard and wear resistant and can be deposited on die plate face 26 relatively easily.

The unique construction described above provides a die plate of maximum life. The edge defining extrusion orifice 18 actually acts as a knife in the cutting process. As the extrudant exits orifice 18, the moving cutting blade wipes over surface 36 a minimum, but requisite clearance from surface 36. The shearing action imposed by the cutting blades against the extrudant renders the edge defining orifice 18 a knife edge. It will be readily apparent that unless the material defining extrusion port 22 is wear resistant, it will soon wear, adjacent and at the orifice 18, due to the cutting effects described above. When this occurs, non-uniform pellet size results. Because the material of extrusion port formations 24 is more wear resistant relative to that of the materials of die plate body 10, wearing is greatly minimized. On the other hand, because it is of a machinable quality and therefore can retain its integrity when subjected to machining operations such as drilling, milling or the like, a smooth, uniform extrusion port can be formed therein ensuring that the pellets will be of uniform size. Because the material of extrusion port formation 24 is machinable, there is no necessity to preform extrusion port 22 prior to making the die plate such as is required in U.S. Pat. No. 3,271,822. Additionally, since extrusion port formation 24 is formed from a machinable quality of material, its tendency to chip or sliver and thereby form a non-uniform extrusion port is greatly minimized.

From the above description, it is apparent that numerous modifications may be made in the apparatus and method of the present invention without departing from the spirit or scope thereof. Accordingly, it is intended that the invention be limited only by the appended claims.

I claim:

1. An extrusion die plate for a pelletizing apparatus comprising:
   a die plate body having a die plate face and provided with a plurality of extrusion passageways extending therethrough,
   discreet, spaced extrusion port formations positioned on said die plate body, each of said extrusion port formations having a portion protruding outwardly from said die plate face, each of said formations defining an extrusion port which registers with one of the extrusion passageways in said die plate body, said extrusion port terminating at an extrusion orifice,
   each of said extrusion port formations, being formed of a unitary body of a machinable material of greater abrasion resistant than the material of said die plate body, each of said formations having a substantially planar discharge surface surrounding said extrusion orifice, said surfaces being substantially coplanar, and an abrasion resistant facing being positioned on said die plate face, said facing substantially filling the space between said extrusion port formations, and forming a substantially planar discharge face with said discharge surfaces on said extrusion port formations.

2. The die plate of claim 1 wherein said extrusion port formations are welded to said die plate body.

3. The die plate of claim 1 wherein each of said extrusion port formations is disposed in a respective depression in said die plate face.

4. The die plate of claim 3 wherein said extrusion port formations are welded in said depressions.

5. The die plate of claim 1 wherein said facing is comprised of a carbide material.

6. The die plate of claim 1 wherein said facing is comprised of a ceramic material.

7. The die plate of claim 1 wherein said facing is comprised of an abrasion resistant alloy.

8. The die plate of claim 1 wherein said extrusion port formations are comprised of an abrasion and wear resistant alloy of different composition than the material of said die plate body.

9. The die plate of claim 8 wherein said alloy comprises a cobalt-chromium-tungsten alloy.

* * * * *